US009352793B2

(12) United States Patent
Vitas et al.

(10) Patent No.: US 9,352,793 B2
(45) Date of Patent: May 31, 2016

(54) SLIDE SHOE FOR UNDERCARRIAGE FRAME ASSEMBLY

(71) Applicant: Caterpillar Global Mining LLC., South Milwaukee, WI (US)

(72) Inventors: Jonathan Vitas, Waukesha, WI (US); Jeanne Yaunke, Delavan, WI (US)

(73) Assignee: Caterpillar Global Mining LLC, Oak Creek, WI (US)

( * ) Notice: Subject to any disclaimer, the term of this patent is extended or adjusted under 35 U.S.C. 154(b) by 370 days.

(21) Appl. No.: 13/796,286

(22) Filed: Mar. 12, 2013

(65) Prior Publication Data

US 2014/0265548 A1    Sep. 18, 2014

(51) Int. Cl.
*B62D 55/084* (2006.01)
(52) U.S. Cl.
CPC ................. *B62D 55/0847* (2013.01)
(58) Field of Classification Search
CPC ............... B62D 55/08; B62D 55/0847; B62D 55/0882; B62D 55/00; B62D 55/04; B62D 55/10; B62D 55/14; B62D 55/18; B62D 55/253; B62D 55/30
USPC ............ 305/60, 107, 108, 109, 110, 116, 124
See application file for complete search history.

(56) References Cited

U.S. PATENT DOCUMENTS

| 3,053,334 | A | * | 9/1962 | Bauer | 180/9.1 |
|---|---|---|---|---|---|
| 3,631,615 | A | * | 1/1972 | Reinsma et al. | 37/411 |
| 4,006,940 | A | * | 2/1977 | Halterman, Jr. | 305/139 |
| 4,650,259 | A | * | 3/1987 | Alexander et al. | 305/146 |
| 5,279,378 | A | | 1/1994 | Grawy et al. | |
| 5,409,306 | A | | 4/1995 | Bentz | |
| 2001/0054844 | A1 | * | 12/2001 | Rutz et al. | 305/116 |
| 2002/0005665 | A1 | * | 1/2002 | Ito et al. | 305/110 |
| 2002/0070606 | A1 | * | 6/2002 | Poetter | 305/127 |
| 2005/0040706 | A1 | * | 2/2005 | Yamamoto et al. | 305/139 |
| 2005/0275287 | A1 | * | 12/2005 | Breton | 305/107 |
| 2011/0006597 | A1 | | 1/2011 | Diekevers et al. | |

FOREIGN PATENT DOCUMENTS

EP        2511163 A1 * 10/2012

* cited by examiner

*Primary Examiner* — Kip T Kotter
(74) *Attorney, Agent, or Firm* — Miller, Matthias & Hull LLP

(57) ABSTRACT

A slide shoe installs on an undercarriage frame assembly of an excavating machine to prevent contact by the lugs of track links when the track buckles. The slide shoe is connected at a top surface to a mounting bar extending between side plates of the frame assembly. The slide shoe may include a front bottom beveled surface extending forward from a bottom surface to a front surface and a rear bottom beveled surface extending rearward from the bottom surface, with the beveled surfaces oriented at upward angles with respect to a line parallel to the bottom surface. A rear upper beveled surface extends rearward from the top surface and is oriented at a downward angle with respect to a line parallel to the top surface and intersects the rear bottom beveled surface at a rear tip of the slide shoe.

10 Claims, 7 Drawing Sheets

SLIDE SHOE FOR UNDERCARRIAGE FRAME ASSEMBLY

TECHNICAL FIELD

This disclosure relates generally to earthmoving equipment and, in particular, to an improved slide shoe for an undercarriage of an excavation machine for preserving structural integrity of an undercarriage frame as the excavating machine operates on varying surfaces.

BACKGROUND

Earthmoving machines, for example excavating equipment such as rope shovels, are commonly used to move large amounts of earth, rocks or other work materials. Excavating equipment, including rope shovels and other types of excavating equipment, may be propelled by an undercarriage having a pair of parallel tracks that distribute the weight of the excavating equipment so that the equipment can operate on surfaces having varying hardness and undulations. FIG. 1 illustrates one example of an excavating machine in the form of a rope shovel 10 having a body 12 rotatably mounted on an undercarriage 14 for rotation about an axis 16 to position an implement 18 of the machine 10. The implement 18 may be suspended from a boom 20 and maneuvered by a series of cables 22 to operate on work material (not shown). The undercarriage 14 supports the machine 10 on ground 24, and includes a pair of parallel tracks 26 formed from a series of interconnected links 28. The undercarriage 14 includes a series of idler rollers 30 supported at the bottom of a frame assembly 32 and a series of carrier rollers or carrier slides 34 supported at the top of the frame assembly 32 over which the tracks 26 pass to move the machine 10 over the ground 24. A first tumbler 36 is mounted to the frame assembly 32 proximate to the ground 24 at a front end 38 of the undercarriage 14. A drive tumbler 40 is mounted to the frame assembly 32 above the ground 24 at a rear end 42 of the undercarriage 14. The drive tumbler 40 is operatively connected to a power transmission assembly (not shown) of the machine 10, and engages and drives the tracks 26 to move the machine 10 forward and backward as necessary to perform operations on the work material.

FIG. 2 shows one example of the link 28 as known in the art. The link 28 includes a body 44 having a ground engaging surface 46 and an oppositely disposed roller path 48 defined by a pair of lugs 50 extending upwardly from the body 44. The link 28 further includes a pair of male connection portions 52 extending from one side of the body 44, and a pair of female connection portions 54 extending from the opposite side of the body 44 and configured to receive the male portions 52 of the adjacent link 28. After the portions 52, 54 are mated, a pivot pin (not shown) is inserted through openings of the portions 52, 54 to connect the links 28 and allow the links 28 to pivot relative to each other. Returning to FIG. 1, the drive tumbler 40 includes teeth 56 that engage the lugs 50 of the links 28 to drive the tracks 26 forward and in reverse. The teeth 56 of the drive tumbler 40 may be spaced so that the roller path 48 passes over a central portion of the drive tumbler 40, and the roller path 40 and also passes over the idler rollers 30 as the track 26 was passed the idler rollers 30.

When the drive tumbler 40 drives the tracks 26 forward so that the front end 38 is leading the undercarriage 14 across the ground 24, the positioning of the front tumbler 36 proximate to the ground ensures that the tracks 26 roll over the front tumbler 36 and onto the idler rollers 30 without the links 28 buckling between the front tumbler 36 and front idler roller 30. In contrast, when the drive tumbler 40 drives the tracks 26 in reverse and the rear end 42 is leading, a gap between the drive tumbler 40 and the rear idler roller 30R is exposed for engagement by the material forming the ground 24. Ground material engaging the tracks 26 at the gap between the drive tumbler 40 and the rear idler roller 30R can cause the tracks 26 to buckle and drive the links 28 into the frame assembly 32 of the undercarriage 14. The buckling may occur with particular frequency when the machine 10 travels over soft or uneven ground.

FIG. 3 illustrates one example of an undercarriage frame assembly 32 for a crawler crane where buckling of the tracks 26 may occur. The undercarriage frame assembly 32 includes a main frame 58 carrying the idler rollers 30 and the idler tumbler 36, and a unitary end casting 60 mounted at a rear end of the main frame 58 and carrying the drive tumbler 40 and rear idler roller 30R. When the tracks 26 buckle between the drive tumbler 40 and the rear idler roller 30R, the lugs 50 of the links 28 can hit a lower edge 62 of the end casting 60. Repeated impact of the lugs 50 against the lower edge 62 causes wear to both components, and can eventually damage the end casting 60 to the point where replacement of the end casting 60 or even the frame assembly 32 is required. Damage to the end casting 60 is mitigated in some machines 10 by providing a slide shoe 64 mounted to the lower edge 62 of the end casting 60.

As shown in FIGS. 4 and 5, the lower edge 62 of the end casting 60 is positioned proximate the teeth 56 of the drive tumbler 40 where the links 28 (not shown) roll off the drive tumbler 40 when the tracks 26 are driven in reverse. The slider shoe 64 is affixed to the lower edge 62 by welds or other appropriate connection mechanism. The upper portion of the slider shoe 64 has a shaped surface 66 that corresponds to the shape of the lower edge 62 for attachment thereon. Based on this configuration, the slider shoe 64 is customize for application to the lower edge 62 of the unitary end casting 60, and may not be readily adaptable for other undercarriage frame assembly configurations.

FIG. 6 illustrates one example of an alternative configuration of a rear portion of a frame assembly 70 that is used in undercarriages of alternative machines 10. The frame assembly 70 may be formed by a pair of spaced frame side plates 72I, 72O that extend from the front of the undercarriage to the rear of the undercarriage, and does not include a separate end casting 60 for the rear idler roller 30R and drive tumbler 40 as described above for the frame assembly 32. The left or inner frame side plate 72I is removed in FIG. 6 for purposes of illustrating the support structure connecting the frame side plates 72I, 72O to each other. The rear idler roller 30R and the drive tumbler 40 are also removed, but the positions of the rear idler roller 30R and the drive tumbler 40 will be apparent from a rear idler axle opening 74 and drive tumbler axle opening 76 through the right or outer side plate 72O.

In the illustrated configuration, the spaced frame side plates 72I, 72O are connected by a series of cross supports extending there between. The cross supports include an upper cross support plate 78 connected proximate upper edges 80 of the frame side plates 72I, 72O, a lower cross support plate 82 connected proximate lower edges 84 of the frame side plates 72I, 72O, and an intermediate cross support plate 86 positioned above the rear idler roller axle opening 74. A generally vertical stiffener plate 88 extends from the upper cross support plate 78 to the lower cross support plate 82, and is engaged by a rear edge 90 of the intermediate cross support plate 86 for reinforcement. As shown in FIG. 6, the lower cross support plate 82 is disposed in the gap between the rear idler pulley 30 and the drive tumbler 40. When the drive tumbler 40 drives the tracks 26 forward, the portions of the tracks 26 between the rear idler pulley 30 and the drive tumbler 40 remain taut and spaced from the lower cross support plate 82 so that the lugs 50 of the links 28 do not engage the lower cross support plate 82. In contrast, when the tracks 26 are driven in reverse by the drive tumbler 40, slack can exist in the links 28 as the tracks 26 roll off the drive tumbler 40. As the ground engages the slack portions of the tracks 26, the links 28 bunch up between the drive tumbler 40 and the rear idler roller 30R toward the lower edge 84 of the frame side plates 72I, 72O, and the lugs 50 can engage a rear edge 92 of the lower cross support plate 82. Both the lugs 50 and the lower cross support plate 82 experience wear as a result of the engagement, and in some instances the lower cross support plate 82 can be ripped out of the frame assembly 70 by the lugs 50. In view of this, a need exists for a mechanism for the frame assembly 70 having spaced frame side plates 72I, 72O to prevent buckling of the tracks 26 and engagement of the structures of the frame assembly 70 by the links 28 that can cause wear and damage to the frame assembly 70.

SUMMARY OF THE DISCLOSURE

In one aspect of the present disclosure, a slide shoe for installation in an undercarriage frame assembly of an excavating machine is disclosed. The slide shoe may include a front surface, a top surface approximately perpendicular to the front surface and intersecting the front surface, and a bottom surface approximately perpendicular to the front surface. The slide shoe may also include a front bottom beveled surface extending forward from the bottom surface to the front surface and oriented at an upward angle with respect to a line parallel to the bottom surface, a rear bottom beveled surface extending rearward from the bottom surface and oriented at an upward angle with respect to a line parallel to the bottom surface, and a rear upper beveled surface extending rearward from the top surface and oriented at a downward angle with respect to a line parallel to the top surface. The rear bottom beveled surface and the rear upper beveled surface converge and intersect at a rear tip of the slide shoe.

In another aspect of the present disclosure, a slide shoe assembly for an undercarriage frame assembly of an excavating machine is disclosed. The undercarriage frame assembly includes a spaced pair of frame side plates, a drive tumbler having a plurality of teeth and a rear idler roller rotatably mounted between the spaced pair of frame side plates, a track comprised of a plurality of interconnected links each having a pair of lugs engaged by the plurality of teeth of the drive tumbler to drive the track, and a roller path disposed between the pair of lugs. The slide shoe assembly may include a mounting bar configured to extend between inner surfaces of the spaced pair of frame side plates and to be connected thereto between the drive tumbler and the rear idler roller and proximate lower edges of the spaced pair of frame side plates, and a slide shoe having a top surface connected to a bottom surface of the mounting bar at a location along a path of travel of the plurality of interconnected links of the track and between the pair of lugs of each of the plurality of interconnected links. The slide shoe may be dimensioned to be received between the pair of lugs of each of the plurality of interconnected links and to engage the roller path of each of the plurality of interconnected links.

Additional aspects are defined by the claims of this patent.

DETAILED DESCRIPTION

Although the following text sets forth a detailed description of numerous different embodiments of the present disclosure, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 6:
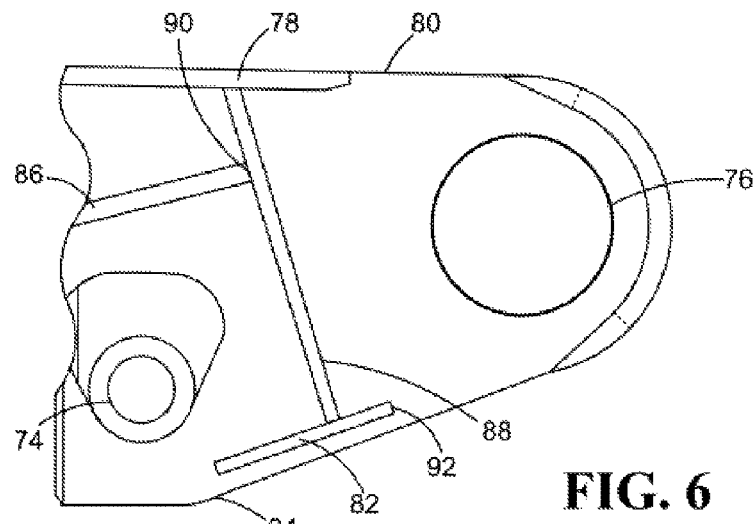
FIG. 6 is side view of a rear portion of an exemplary frame assembly formed by pair of spaced side plates with one of the side plates, a rear idler roller and a drive tumbler removed for clarity.
Figure 7:
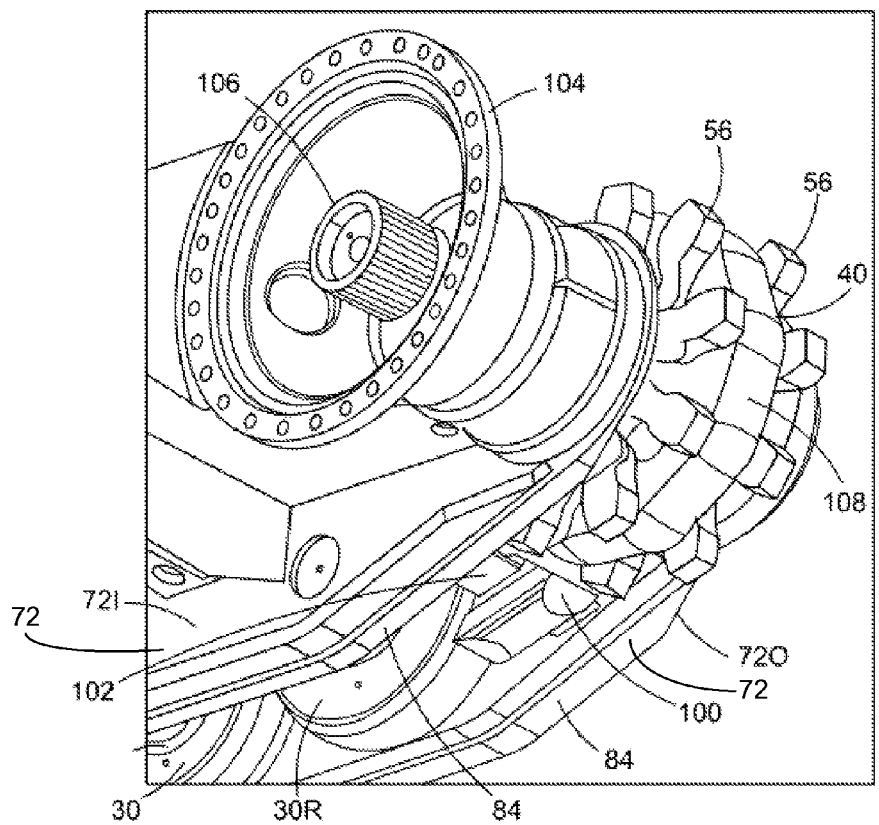
FIG. 7 is a bottom left perspective view of the frame assembly of FIG. 6 having a slide shoe and a mounting bar in accordance with the present disclosure installed thereon.

FIG. 7 illustrates the frame assembly 70 of FIG. 6 reconfigured to include a slide shoe assembly including a slide shoe 100 and mounting bar 102 in accordance with the present disclosure mounted between the frame side plates 72I, 72O for preventing bunching of the links 28 of the track 26 (not shown) when the drive tumbler 40 drives the track 26 in reverse. A flange 104 mounted on the inboard side of the inner frame side plate 72I may enclose a tumbler drive axle 106 operatively connecting the power transmission assembly (not shown) of the machine 10 to the drive tumbler 40. The mounting bar 102 may extend between inner surfaces of the frame side plates 72I, 72O proximate the lower edges of the frame side plates 72I, 72O and be welded or otherwise securely attached thereto. The slide shoe 100 may be connected to the mounting bar 102 and positioned along the mounting bar 102 in line with the idler rollers 30 and a central portion 108 of the drive tumbler 40. The location of the slide shoe 100 in turn positions the slide shoe 100 in line with the roller paths 48 of the links 28 along a path of travel of the track 26 as the track 26 passes from the drive tumbler 40 to the rear idler roller 30R.

Figure 8:
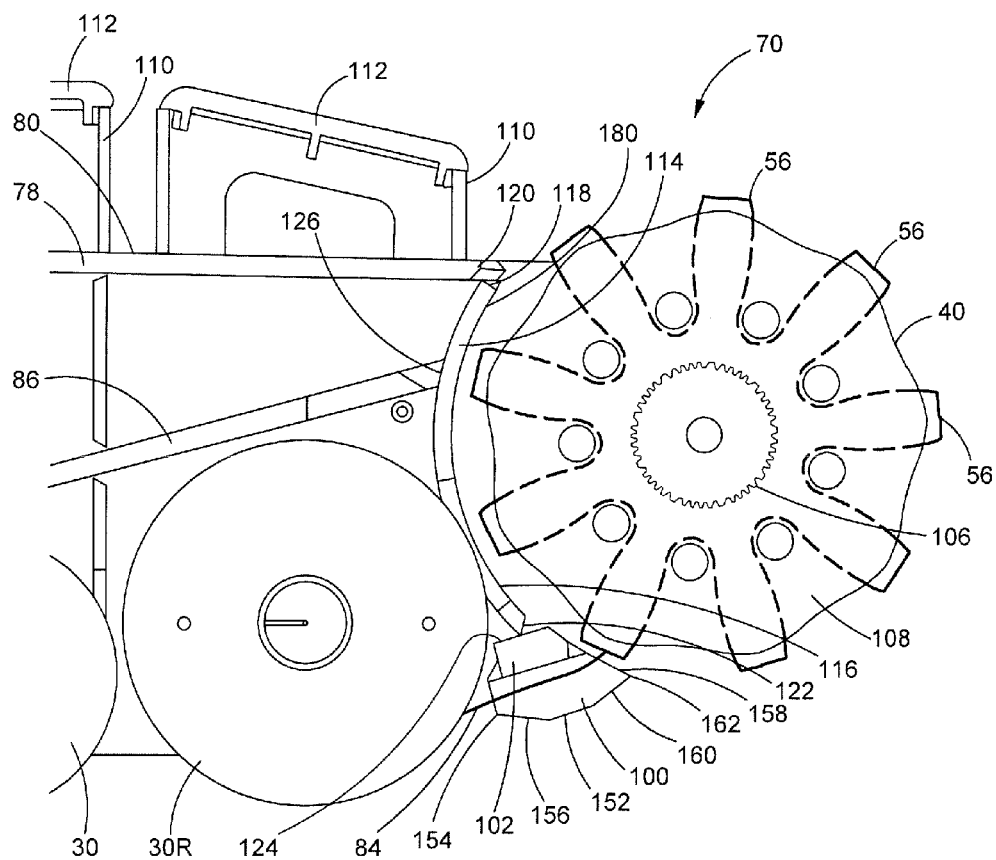
FIG. 8 is a side view of the frame assembly of FIG. 7 with one of the side plates removed for clarity.

The interior components of the rear portion of the frame assembly 70 are shown in greater detail in side view of FIG. 8 wherein the inner frame side plate 72I, the flange 104 and the near-side set of teeth 56 are removed for clarity. The frame assembly 70 includes a series of upper slide bases 110 and associated upper slide castings 112 mounted on the upper cross support plate 78 and extending between the drive tumbler 40 and the front tumbler 36 to guide the track 26 as it moves between the tumblers 36, 40 above the upper edge 80 of the frame side plates 72. In the illustrated configuration of the frame assembly 70, the lower cross support plate 82 and the vertical stiffener plate 88 are replaced by the slide shoe 100, the mounting bar 102, and a curved stiffener plate 114. The curved stiffener plate 114 has a concave curvature along a rear inner surface corresponding to the outer extents of the drive tumbler 40, and partially encircles the drive tumbler 40 while allowing the drive tumbler 40 to rotate freely as the power transmission assembly drives the tumbler drive axle 106 and the drive tumbler 40. At a lower portion of the curved stiffener plate 114, a rear idler roller opening 116 may be provided to avoid interference with the rear idler roller 30R when the rear idler roller 30R is installed.

Lateral edges of the curved stiffener plate 114 are welded or otherwise affixed to inner surfaces of the frame side plates 72 to maintain separation of the frame side plate 72 at the rear of the frame assembly 70. An upper edge 118 of the curved stiffener plate 114 is disposed proximate to a rear edge 120 of the upper cross support plate 78. The rear edge 120 may abut the curved stiffener plate 114, and may be welded to the curved stiffener plate 114 proximate the upper edge 118 to provide reinforcement of the curved stiffener plate 114. A lower edge 122 may be disposed proximate an upper surface 124 of the mounting bar 102, and may abut and/or be welded or otherwise affixed thereto to provide further reinforcement of the curved stiffener plate 114. A rear edge 126 of the intermediate cross support plate 86 may abut and/or be welded or otherwise affixed to a front outer surface of the curved stiffener plate 114.

Figure 9:
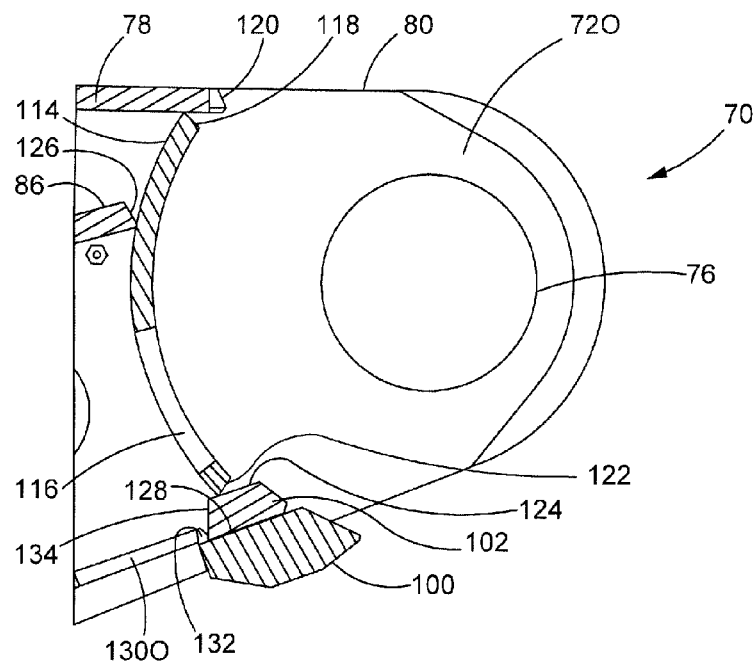
FIG. 9 is a side view of the frame assembly of FIG. 6 having the slide shoe, the mounting bar and the curved stiffener plate installed thereon in a new factory installation.

FIG. 9 illustrates an enlarged view of the rear portion of the outer frame side plate 72O that is similar to the view shown in FIG. 6 of the frame assembly 70, but with the lower cross support plate 82 and the vertical stiffener plate 88 replaced by the mounting bar 102 and the curved stiffener plate 114 in a new factory installation, and with the slide shoe 100 mounted on a bottom surface 128 of the mounting bar 102. In the new factory installation of the slide shoe assembly, the upper cross support plate 78 and the intermediate cross support plate 86 may have substantially the same configuration as in the previous implementation of the frame assembly 70. Additional support for the mounting bar 102 and, correspondingly, the slide shoe 100 may be provided by a pair of gussets 130 (only outer gusset 130O is shown) attached to the mounting bar 102 and the corresponding frame side plates 72. Each gusset 130 may have a generally triangular shape with a first or side edge connected to the corresponding frame side plate 72, a second or rear edge 132 connected to a front side 134 of the mounting bar 102, and a third edge shaped to avoid engagement with the rear idler roller 30R. The third edge may be straight, curved or otherwise shaped in a complementary fashion to the rear idler roller 30R.

Figure 10:
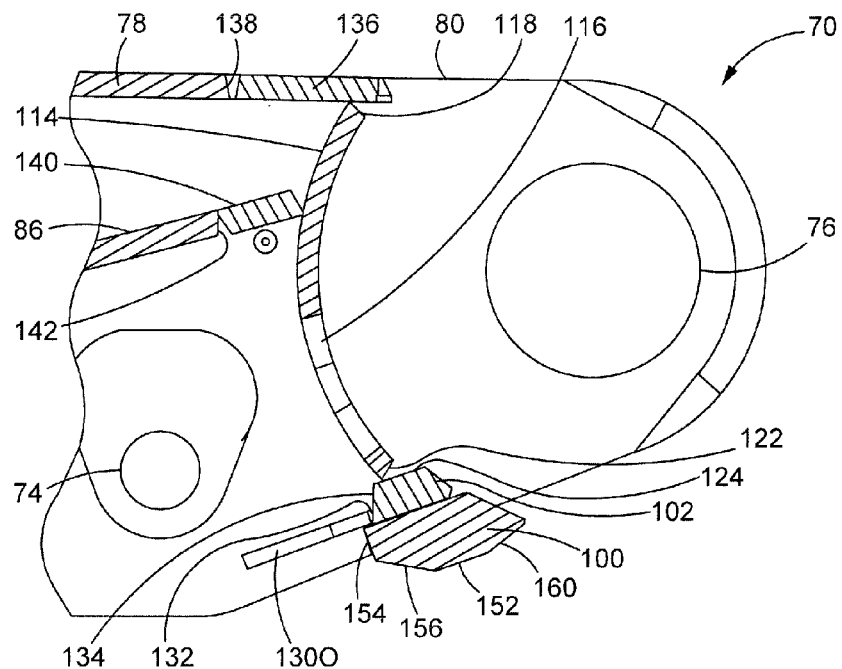
FIG. 10 is a side view of the frame assembly of FIG. 6 having the slide shoe, the mounting bar and the curved stiffener plate installed thereon in a retrofit installation.

FIG. 10 illustrates a retrofit installation of the slide shoe assembly including the slide shoe 100, the mounting bar 102 and the curved stiffener plate 114 into an existing frame assembly 70. When retrofitting the slide shoe 100, the upper cross support plate 78 and the intermediate cross support plate 86 may have rear portions removed to facilitate removal of the vertical stiffener plate 88 and installation of the curved stiffener plate 114. The removed portions of the upper cross support plate 78 and the intermediate cross support plate 86 may be replaced by a first bridge plate 136 along the upper edge 80 between a new rear edge 138 of the upper cross support plate 78 and the upper edge 118 of the curved stiffener plate 114, and a second bridge plate 140 extending between a new rear edge 142 of the intermediate cross support plate 86 and the curved stiffener plate 114. Once completed, the retrofit installation of the slide shoe 100, the mounting bar 102 and the curved stiffener plate 114 functions in a substantially similar manner to the factory installation illustrated in FIG. 9 as described above.

Figure 11:
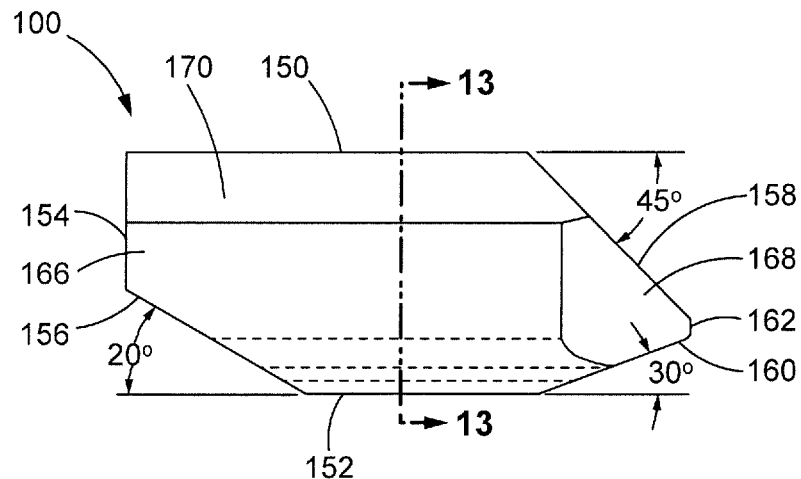
FIG. 11 is a side view of the slide shoe of FIG. 7.
Figure 12:
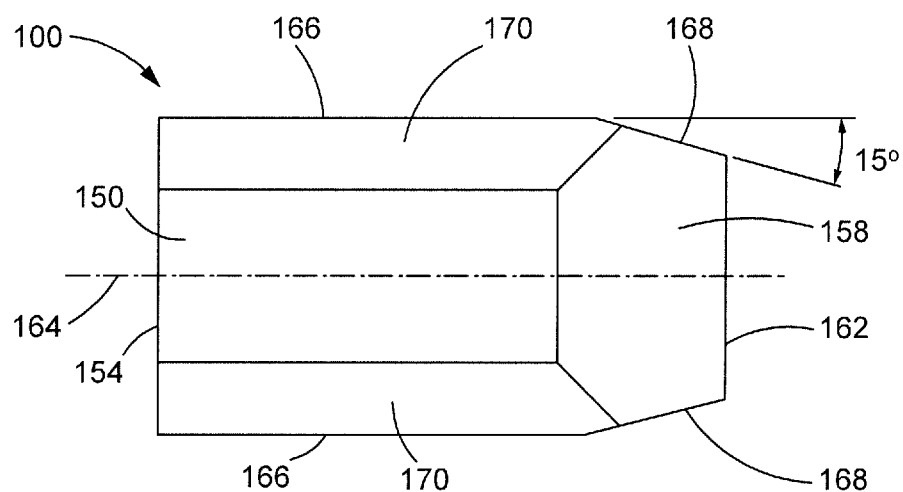
FIG. 12 is a top view of the slide shoe of FIG. 7.
Figure 13:
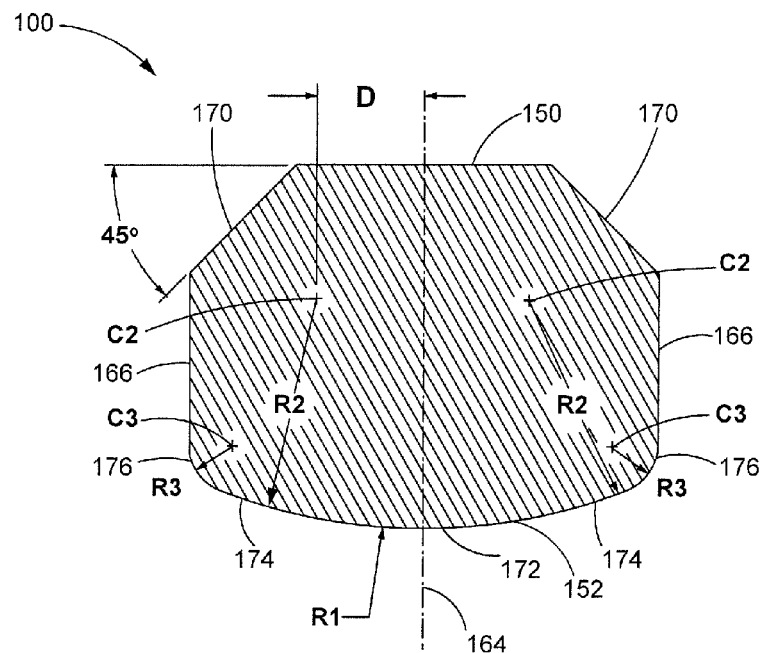
FIG. 13 is a cross-sectional view of the slide shoe of FIG. 7 taken through line 13-13.

The slide shoe 100 is shown in greater detail in FIGS. 11-13 wherein the features of the slide shoe 100 facilitating interaction with the links 28 of the tracks 26 are illustrated. Referring to FIG. 11, slide shoe 100 has a top surface 150 and a bottom surface 152 that are approximately parallel to each other, and a front surface 154 that is approximately perpendicular to the surfaces 150, 152. The top surface 150 and the front surface 154 are generally planar, and the bottom surface 152 has a convex curvature that corresponds to and is complimentary to a concave curvature of the roller paths 48 of the links 28 as will be discussed more fully below. The top surface 150 and the front surface 154 intersect, while a front bottom beveled surface 156 transitions the bottom surface 152 to the front surface 154. The front bottom beveled surface 156 may be angled upwardly with respect to a line parallel to the bottom surface 152 at an angle equal to approximately 20°. The front bottom beveled surface 156 eliminates a lower front edge formed by intersecting the bottom surface 152 and the front surface 154 on which a leading edge of a link 28 may catch when the track 26 is driven in the forward direction and buckles after passing the rear idler roller 30R.

At the rear of the slide shoe 100 that will be oriented toward the drive tumbler 40 at installation, the slide shoe 100 includes a rear upper beveled surface 158 extending downwardly from a point of intersection with the top surface 150, and a rear bottom beveled surface 160 extending upwardly from a point of intersection with the bottom surface 152. The beveled surfaces 158, 160 converge and intersect at a rear tip 162. The rear upper beveled surface 158 may be angled downwardly with respect to a line parallel to the top surface 150 at an angle equal to approximately 45°, and the rear bottom beveled surface 160 may be angled upwardly with respect to a line parallel to the bottom surface 152 at an angle equal to approximately 30°. The rear upper beveled surface 158 provides clearance allowing the teeth 56 of the drive tumbler 40 to pass the slide shoe 100 without engagement, and the rear bottom beveled surface 160 prevents the leading edge of a link 28 of the track 26 from catching on the slide shoe 100 when the tracks 26 is driven in reverse and the links 28 buckle after rolling off of the drive tumbler 40.

Turning to FIG. 12, a top view of the slide shoe 100 illustrates that the slide shoe 100 is generally symmetrical from side to side about a longitudinal centerline 164. The slide shoe 100 includes oppositely disposed side surfaces 166 that are approximately parallel to each other and are approximately perpendicular to the top surface 150 and to the front surface 154. Oppositely disposed rear lateral beveled surfaces 168 transition the corresponding side surfaces 166 to the rear tip 162. The rear lateral beveled surfaces 168 may be angled inwardly with respect to lines parallel to the corresponding side surfaces 166 at an angle equal to approximately 15°. The tapered configuration of the rear portion of the slide shoe 100 formed by the rear lateral beveled surfaces 168 may assist in aligning the links 28 of the tracks 26 with the slide shoe 100 by engaging the lugs 50 and thereby centering the slide shoe 100 within the roller paths 48 of the links 28.

The cross-sectional view of FIG. 13 further illustrates the symmetry of the slide shoe 100 about the longitudinal centerline 164. The slide shoe 100 includes oppositely disposed lateral upper beveled surfaces 170 forming transitions between the top surface 150 and corresponding side surfaces 166. The lateral upper beveled surfaces 170 may be angled downwardly with respect to lines parallel to the top surface 150 at an angle equal to approximately 45°. The slide shoe 100 is installed on the mounting bar 102 with the top surface 150 facing and engaging the bottom surface 128 of the mounting bar 102 as shown in FIGS. 7-10. When the slide shoe 100 is in place, the lateral upper beveled surfaces 170 and the bottom surface 128 of the mounting bar 102 to form triangular channels for receiving weld filling material when the slide shoe 100 is attached to the mounting bar 102.

FIG. 13 also illustrates the curved contour of the bottom surface 152. In the illustrated embodiment, the bottom surface 152 is defined by a plurality of portions having varying curvature radii in order to match the shape of the roller paths 48 of the links 28. In particular, the bottom surface 152 may have a first central portion 172 centered about the longitudinal centerline 164, a pair of oppositely disposed second intermediate portions 174, and a pair of oppositely disposed third outer portions 176. The first central portion 172 may have a first radius of curvature R1 and a center of curvature (not shown) disposed along the longitudinal centerline 164 at a point outside the body of the slide shoe 100. The second intermediate portions 174 may have a second radius of curvature R2 that is less than the first radius of curvature R1, second centers of curvature C2 that are each spaced from the longitudinal centerline 164 by a distance D, and may have an essentially continuous transition from the first central portion 172. The third outer portions 176 may have a third radius of curvature R3 that is less than the second radius of curvature R2 and have third centers of curvature C3 that are each spaced from the corresponding side surface 166 by a distance equal to the third radius of curvature R3 to provide continuous transitions with the corresponding second intermediate portions 174 and side surfaces 166.

Industrial Applicability

The slide shoe 100 and mounting bar 102 in accordance with the present disclosure allow the links 28 of the tracks 26 to travel normally between the rear idler roller 30R and the drive tumbler 40 when under tension without obstruction, while at the same time engaging the tracks 26 to prevent the links 28 from contacting the frame assembly 70 when there is insufficient tension in the tracks 26 or when the tracks 26 are engaged by the ground material or by other obstructions in the path of travel of the excavating machine 10. As shown in FIG. 8, the mounting bar 102 is installed between the frame side plates 72 proximate the lower edge 84 so that the bottom surface 152 of the slide shoe 100 is below the lower edge 84 and outside the boundaries of the frame side plate 72. However, the bottom surface 152 of the slide shoe 100 is close enough to the lower edge 84 to avoid contacting the links 28 of the tracks 26 when tension exists in the tracks 26 between the rear idler roller 30R and the central portion 108 of the drive tumbler 40. When the proper tension is present in the tracks 26, the links 28 are not in constant contact with bottom surface 152 of the slide shoe 100, thereby reducing wear on the links 28 and the slide shoe 100 and efficiency losses due to friction.

Additional benefits of the geometric configuration of the slide shoe 100 will be apparent to those skilled in the art upon further inspection of FIG. 8. The front surface 154 truncates the slide shoe 100 at the front end to provide sufficient space for the rear idler roller 30R to be removed and replaced without removing the mounting bar 102 from the between the frame side plates 72. When the rear idler roller 30R is installed between the adjacent idler roller 30 and the slide shoe 100, the rear idler roller 30R is partially disposed within the rear idler roller opening 116 in the curved stiffener plate 114.

When the tracks 26 are driven by the drive tumbler 40 in the forward direction, slack in the tracks 26 can exist between the rear idler roller 30R and the drive tumbler 40. The slack in the tracks 26 can allow the links 28 to bob up and down or buckle in this area and come into contact with the slide shoe 100. The front bottom beveled surface 156 provides smooth transition of contact by the leading edges of the links 28. The risk of the links 28 engaging an edge of slide shoe 100 and causing extra wear and potential damage to the components is essentially eliminated. The rear bottom beveled surface 160 provides a similar smooth transition of contact at the rear of the slide shoe 100 when the drive tumbler 40 drives the tracks 26 in the reverse direction. Slack in the tracks 26 exists as the links 28 roll off the drive tumbler 40 in the direction of the rear idler roller 30R so that bobbing and buckling of the tracks 26 are likely to occur. The rear bottom beveled surface 160 eliminates an edge at the rear of the slide shoe 100, and the rear tip 162 is positioned where direct engagement of the rear tip 162 is essentially avoided under normal operating conditions.

The rear upper beveled surface 158 of the slide shoe 100, the mounting bar 102 and the curved stiffener plate 114 are configured to allow the teeth 56 of the drive tumbler 40 to travel unimpeded between the frame side plates 72. The mounting bar 102 may have a rear upper beveled surface (not numbered) that combines with the rear upper beveled surface 158 and, if desired, weld material to form a substantially continuous surface spaced from the ends of the teeth 56 as the teeth 56 rotate past the lower edges 84 of the frame side plates 72. The surface is continued by a concave rear surface 180 of the curved stiffener plate 114. The curvature of the curved stiffener plate 114 eliminates a pinch point present in previous implementations of the frame assembly 70 where the teeth 56 of the drive tumbler 40 pass close to the surface of the flat vertical stiffener plate 88. Instead, a consistent distance is maintained between the teeth 56 and the concave rear surface 180 of the curved stiffener plate 114 as the drive tumbler 40 rotates between the frame side plates 72.

Figure 1:
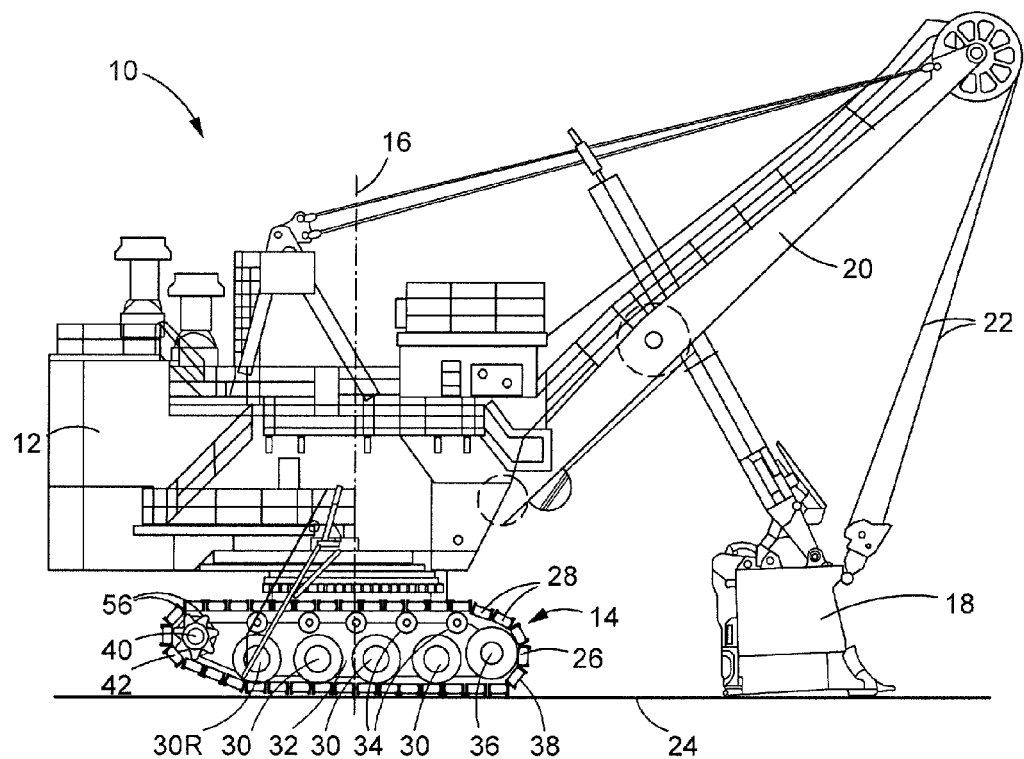
FIG. 1 is a side elevation view of an excavating machine having a ground-engaging implement and a track-type undercarriage.
Figure 2:
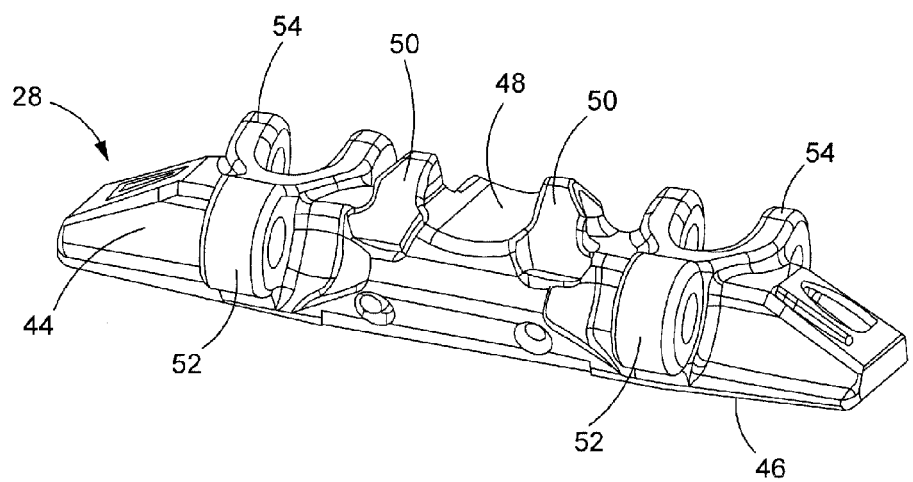
FIG. 2 is a perspective view of an exemplary link of a multi-link track for the undercarriage of the excavating machine of FIG. 1.
Figure 3:
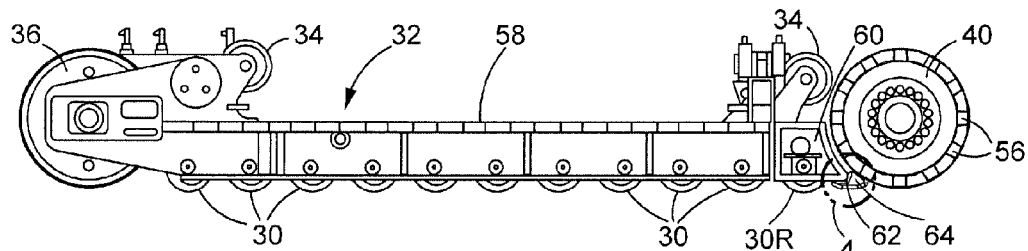
FIG. 3 is a side view of an exemplary previous frame assembly for the undercarriage of the excavator machine of FIG. 1 with a unitary rear end casting.
Figure 4:
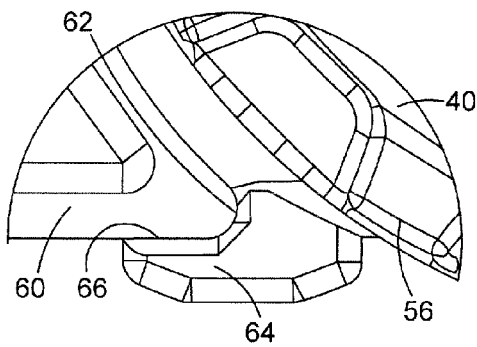
FIG. 4 is an enlarged side view of Detail 4 of the frame assembly of FIG. 3.
Figure 5:
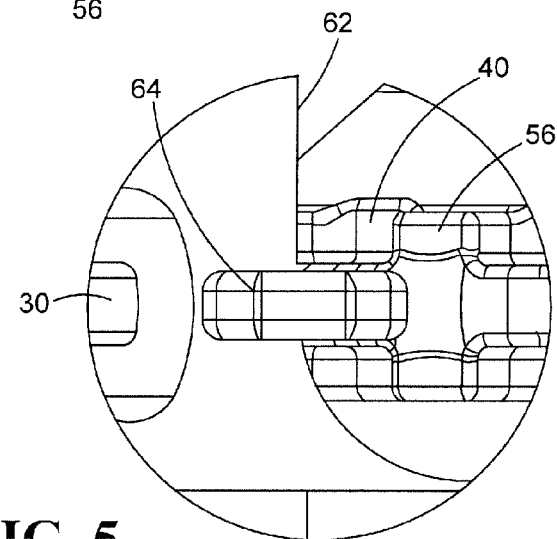
FIG. 5 is an enlarged bottom view of Detail 4 of the frame assembly of FIG. 3.
Figure 14:
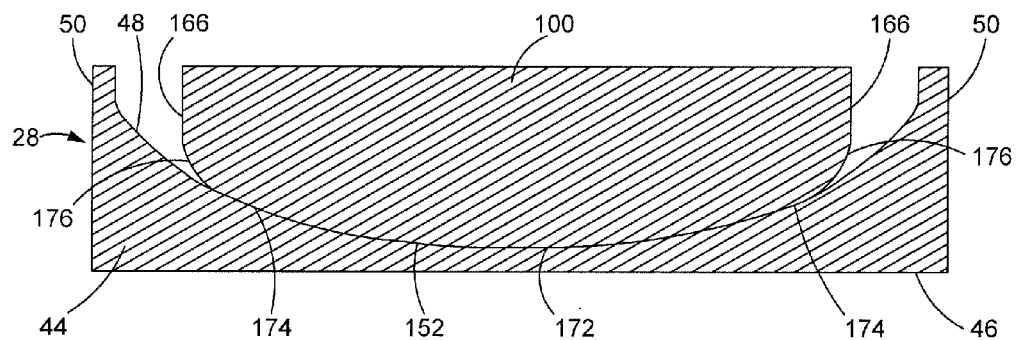
FIG. 14 is a cross-sectional view of a bottom portion of the slide shoe of FIG. 7 received in a roller path of the link of FIG. 2.

The shape of the bottom surface 152 of the slide shoe 100 is configured to correspond to the shape of the roller paths 48 of the links 28. Referring to FIGS. 13 and 14, the curvature formed by the first central portion 172, the second intermediate portions 174 and the third outer portions 176 of the bottom surface 152 provides substantially continuous contact between the first central portion 172 and the second intermediate portions 174 and the surface of the roller path 48, and additional contact between the third outer portions 176 and the roller path 48. The bottom surfaces of the slide shoes 64 of FIGS. 3-5 do not conform to the roller paths 48 of the links 28. Contact between the slide shoe 64 and the roller paths 48 is concentrates on small portions of the slide shoe 64 with smaller surface areas. This configuration results in uneven wear of material in the areas of contact and reshaping of the bottom surface of the slide shoe 64 and the roller paths 48. Even distribution of contact across the bottom surface 152 of the slide shoe 100 and the roller path 48 promotes uniform wear along the bottom surface 152 that maintains the shapes of the curved bottom surface 152 and the roller paths 48 as material wears away over time.

As discussed above, the first radius of curvature R1 is greater than the second radius of curvature R2, and the second radius of curvature R2 is greater than the third radius of curvature R3. In one embodiment of the slide shoe 100, the second radius of curvature R2 may be equal to approximately one-third of the first radius of curvature R1, and the third radius of curvature R3 may be equal to approximately 22% of the second radius of curvature R2. In this and other embodiments, the distance D for the second centers of curvature C2 from the longitudinal centerline 164 may be equal to approximately one-half of the second radius of curvature R2. Given this distance D, the second centers of curvature C2 are separated by a distance approximately equal to the second radius of curvature R2. Of course, those skilled in the art will understand that varying geometric relationships may be used in defining the shape of the bottom surface 152 and its portions 172, 174, 176. Those skilled in the art will also understand that the angles of the beveled surfaces 156, 158, 160, 168 and 170 are exemplary and may be varied based on the particular configurations and dimensions of the frame assembly 70 on which the slide shoe 100, the mounting bar 102 and the curved stiffener plate 114 are being installed. Such alternatives are contemplated by the inventors as having use with slide shoes 100 in accordance with the present disclosure.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A slide shoe assembly for an undercarriage frame assembly of an excavating machine having a spaced pair of frame side plates, a drive tumbler having a plurality of teeth and a rear idler roller rotatably mounted between the spaced pair of frame side plates, a track comprised of a plurality of interconnected links each having a pair of lugs engaged by the plurality of teeth of the drive tumbler to drive the track, and a roller path disposed between the pair of lugs, the slide shoe assembly comprising:
    a mounting bar configured to extend between inner surfaces of the spaced pair of frame side plates and to be connected thereto between the drive tumbler and the rear idler roller and proximate lower edges of the spaced pair of frame side plates; and
    a slide shoe having a top surface connected to a bottom surface of the mounting bar at a location along a path of travel of the plurality of interconnected links of the track and between the pair of lugs of each of the plurality of interconnected links, the slide shoe being dimensioned to be received between the pair of lugs of each of the plurality of interconnected links and to engage the roller path of each of the plurality of interconnected links.

2. The slide shoe assembly of claim 1, wherein the slide shoe comprises:
    a front surface approximately perpendicular to the top surface and intersecting the top surface;
    a bottom surface approximately perpendicular to the front surface;
    a front bottom beveled surface extending forward from the bottom surface of the slide shoe to the front surface and oriented at an upward angle with respect to a line parallel to the bottom surface of the slide shoe; and
    a rear bottom beveled surface extending rearward from the bottom surface and oriented at an upward angle with respect to a line parallel to the bottom surface of the slide shoe.

3. The slide shoe assembly of claim 2, wherein the slide shoe comprises a rear upper beveled surface extending rearward from the top surface and oriented at a downward angle with respect to a line parallel to the top surface, wherein the rear bottom beveled surface and the rear upper beveled surface converge and intersect at a rear tip of the slide shoe.

4. The slide shoe assembly of claim 1, comprising a curved stiffener plate configured to extend between the inner surfaces of the spaced pair of frame side plates and to extend from the mounting bar to an upper cross support plate of the undercarriage frame assembly, wherein the curved stiffener plate has a curvature and partially encircles the drive tumbler.

5. The slide shoe assembly of claim 4, wherein the curved stiffener plate comprises a rear idler roller opening receiving a portion of the rear idler roller.

6. The slide shoe assembly of claim 1, wherein the slide shoe comprises:
    a pair of oppositely disposed approximately parallel side surfaces that are approximately perpendicular to the top surface; and
    a pair of rear lateral beveled surfaces, each rear lateral beveled surface extending rearwardly from a corresponding one of the side surfaces and oriented at an inward angle with respect to a line parallel to the corresponding one of the side surfaces toward a longitudinal centerline of the slide shoe.

7. The slide shoe assembly of claim 1, wherein the slide shoe comprises:
    a pair of oppositely disposed approximately parallel side surfaces that are approximately perpendicular to the top surface;
    a bottom surface extending between the side surfaces and having a convex curvature that is complimentary to a concave curvature of the roller path of each of the plurality of interconnected links.

8. The slide shoe assembly of claim 7, wherein the bottom surface of the slide shoe comprises:
    a first central portion having a first radius of curvature and being symmetrical about a longitudinal centerline of the slide shoe;
    a pair of second intermediate portions having a second radius of curvature and being disposed on opposite sides of the first central portion; and
    a pair of third outer portions having a third radius of curvature and disposed between one of the pair of second intermediate portions and a corresponding one of the side surfaces, wherein the first radius of curvature, the second radius of curvature and the third radius of curvature are not equal.

9. The slide shoe assembly of claim 8, wherein the pair of second intermediate portions of the bottom surface of the slide shoe each have a second center of curvature located a distance from the longitudinal centerline of the slide shoe equal to approximately one half of the second radius of curvature.

10. The slide shoe assembly of claim 8, wherein the first radius of curvature is equal to approximately two times the second radius of curvature.

\* \* \* \* \*